United States Patent [19]

Planchat

[11] Patent Number: 4,735,630
[45] Date of Patent: Apr. 5, 1988

[54] ELECTRODE STACKING STRUCTURE IN AN ACTIVATABLE BATTERY

[75] Inventor: Jean-Pierre Planchat, Noisy Le Sec, France

[73] Assignee: Saft, S.A., Romainville, France

[21] Appl. No.: 2,986

[22] Filed: Jan. 13, 1987

[30] Foreign Application Priority Data

Jan. 16, 1986 [FR] France ................................. 8600564

[51] Int. Cl.$^4$ ............................................. H01M 2/38
[52] U.S. Cl. ....................................... 429/70; 429/72; 429/119
[58] Field of Search ................. 429/70, 72, 81, 119, 429/51

[56] References Cited

U.S. PATENT DOCUMENTS

| 3,437,529 | 4/1969 | Honer ................................. 429/119 |
| 3,717,505 | 2/1973 | Unkle, Jr. et al. ................. 429/72 X |
| 3,884,720 | 5/1975 | Armstrong ........................... 429/119 |
| 4,185,143 | 1/1980 | Birt et al. ............................ 429/119 |
| 4,421,831 | 12/1983 | Garcia, Jr. ........................... 429/70 |
| 4,461,817 | 7/1984 | Itoh et al. .......................... 429/72 X |

FOREIGN PATENT DOCUMENTS

| 101240 | 2/1984 | European Pat. Off. . |
| 1537180 | 7/1968 | France ................................. 429/119 |
| 56-109463 | 8/1981 | Japan . |
| 0103788 | 6/1983 | Japan ..................................... 429/51 |

Primary Examiner—Anthony Skapars
Attorney, Agent, or Firm—Kenyon & Kenyon

[57] ABSTRACT

The electrode structure includes electrolyte injection and collector channels, and, on pairs of opposite sides of each battery cell (1), plates (2) for distributing electrolyte through said cells, said plates being disposed to ensure that the flow of electrolyte through each cell is substantially constant over any point of the area of said cell.

9 Claims, 3 Drawing Sheets

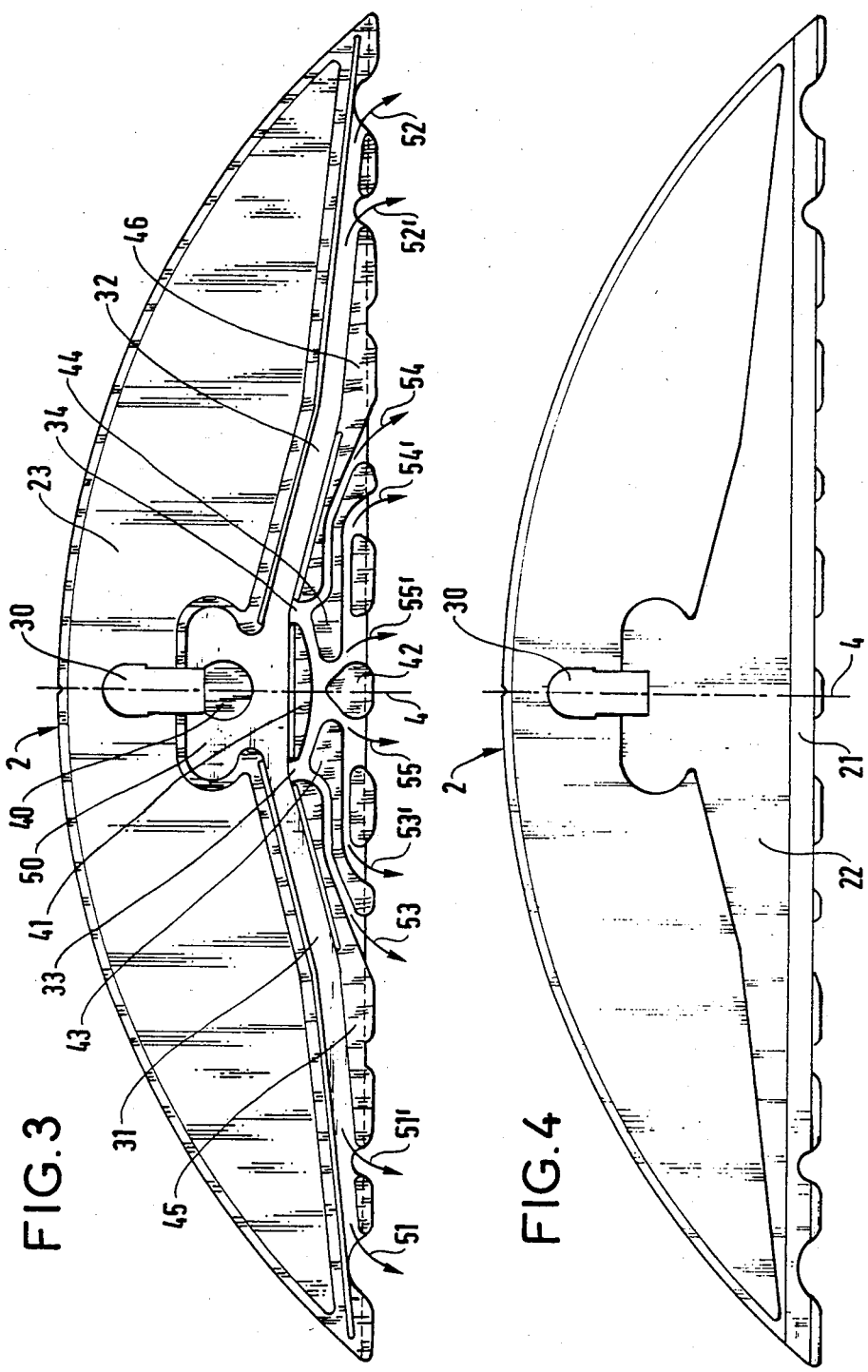

ELECTRODE STACKING STRUCTURE IN AN ACTIVATABLE BATTERY

The present invention relates to an electrode stacking structure in an activatable battery through which electrolyte is caused to flow.

BACKGROUND OF THE INVENTION

The invention is applicable, for example, to batteries which are activated by seawater, to certain kinds of lithium battery, and to batteries implementing silver oxide and aluminum couples. Silver oxide and aluminum couple batteries make use of an electrolyte flow constituted by a concentrated aqueous solution of alkaline hydroxide, and the temperature of the electrolyte, in operation, may rise to 90° C., or higher. However, the stability of the silver oxide electrode falls off at around 100° C. and unwanted oxygen formation takes place.

A problem which arises is that of ensuring that electrolyte is distributed within each couple so as to remove the hundreds of thermal watts which are generated therein, while simultaneously providing adequate sealing between successive couples and limiting electrical leakage currents.

European patent specification No. 0101240 describes a stack of bipolar electrodes surrounded by frames which are fixed to one another and which ensure that the electrodes remain suitably spaced apart, with the frames being provided with means for distributing electrolyte between the electrodes.

Such a disposition is not applicable to AgO/Al activatable batteries where the electrodes are very thin, where they are not bipolar as in the above-mentioned patent specification, and where spacing between electrodes under pressure is provided by glued-on tabs.

Preferred implementations of the present invention provide a stacking structure suitable for activatable AgO/Al batteries and capable of solving the above-mentioned problem.

SUMMARY OF THE INVENTION

The present invention provides an electrode stacking structure in an activatable AgO/Al battery including a Volta pile or stack, each cell in the stack being substantially rectangular in shape and comprising a positive electrode, a negative electrode, and spacer tabs fixed to one of said electrodes, the structure comprising electrolyte injection channels and electrolyte collector channels together with a pump for circulating the electrolyte so that it runs from the injection channels into the collector channels, the structure including the improvements whereby an electrolyte distributor plate is fixed on each of two opposite sides of each cell, said plate having at least one transverse orifice for electrolyte entry or exit in communication with a plurality of channels provided with baffles so as to ensure a substantially constant electrolyte flowrate over any point of the area of a cell, and wherein the edge of each plate includes both a shoulder to which the edge of the negative electrode is glued and a plurality of successive shoulders enabling the plate to be interfitted, with a degree of play with identical plates of adjacent cells.

In order to avoid hot spots being created in the battery, the flow of electrolyte through each couple is limited, unlike prior art techniques, and the flows through the various couples are in mutual equilibrium.

The said distributor plates are preferably identical on opposite ends of a given cell. They are made by molding a plastic polymer material capable of withstanding high temperatures. For example, polybutylene terephthalate may be used.

A plate in an AgO/Al battery is about 1.2 mm thick, and corresponds to the cell pitch. The channels are two to three tenths of a millimeter deep.

All of the outlets from the channels lead to a common line parallel to the edge of the electrodes.

The electrolyte inlet orifice advantageously includes a flow rate limiter constituted by a bump which is integrally molded with the distributor plate.

BRIEF DESCRIPTION OF THE DRAWINGS

An embodiment of the invention is described by way of example with reference to the accompanying drawings, in which:

FIGS. 3 and 4 are respectively a front and a back elevation of a plate shown in FIG. 1.

MORE DETAILED DESCRIPTION

Figure 1:
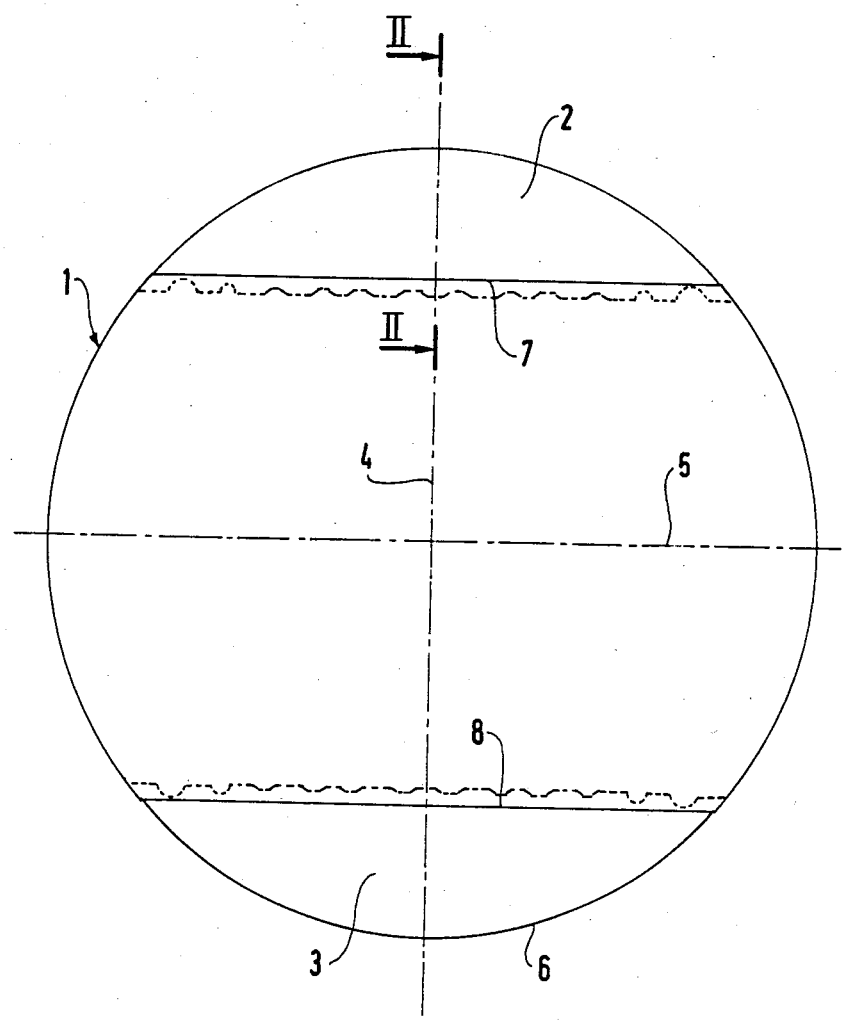
FIG. 1 is a diagrammatic plan view of an electrode of a cell in a battery in accordance with the invention and associated with two distribution plates.

FIG. 1 is a diagrammatic plan view showing the outline of a an AgO/Al battery cell 1 having two electrolyte distributing plates 2 and 3 disposed at opposite ends thereof. Axes 4 and 5 define a point of intersection which is the center of a circle 6 in which the asssembly 1-2-3 is contained. The electrodes per se are symmetrical about both of said axes; they have edges 7 and 8 which are rectilinear and parallel to the axis 5.

Figure 2:
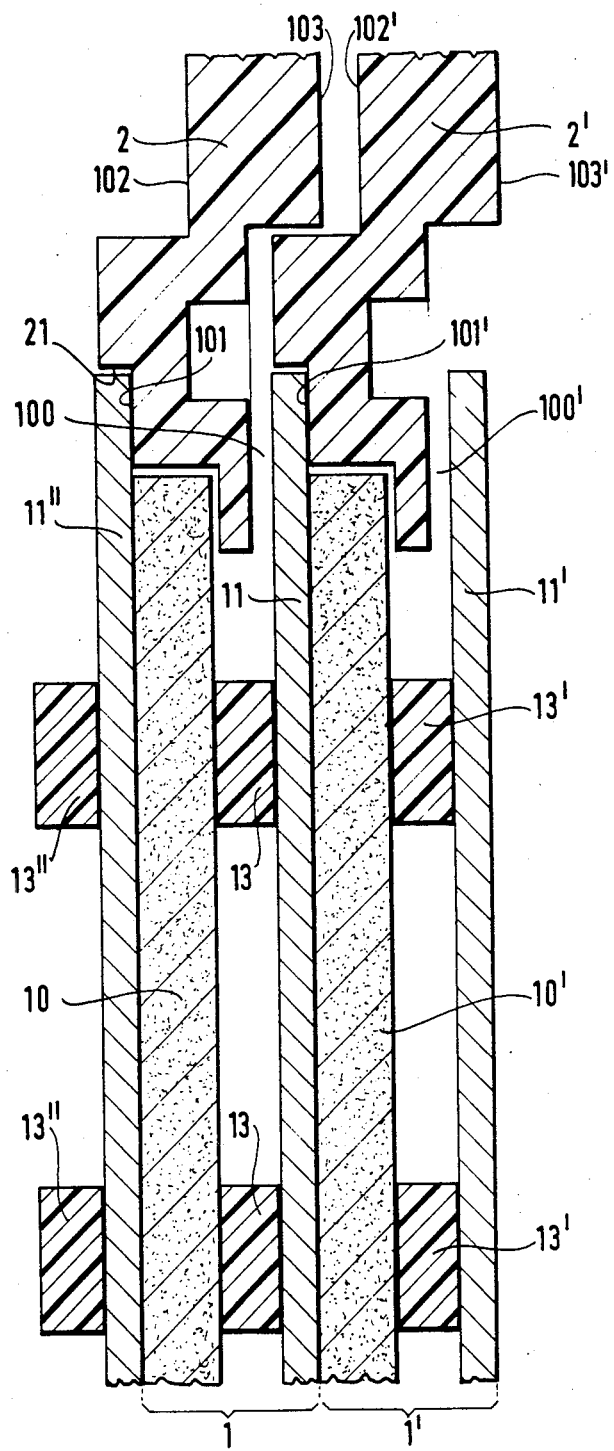
FIG. 2 is a highly diagrammatical cross-section through a cell on a line II—II of FIG. 1.

FIG. 2 (section II—II in FIG. 1) shows, in partial and very approximate form the cell 1 of FIG. 1 together with an adjacent cell 1' in the stack.

The cell 1 comprises:

a positive electrode 10 made of silver oxide having a thickness of about 0.57 mm;

a negative electrode 11 made of aluminum and having a thickness of about 0.27 mm and glued to a shoulder 101' on a distributor plate 2'; and spacing tabs 13 having a thickness of about 0.45 mm and glued to the electrode 11.

The cell 1' has a positive electrode 10', a negative electrode 11', and spacing tabs 13' which are substantially identical to those of the cell 1. The figure also shows the negative electrode 11" of the cell disposed on the opposite side of the cell 1 from the cell 1'.

The distributor plate 2 of the cell 1 has a step 21 against which the electrode 11" is fixed. Similarly the distributor plate 2' of the cell 1' is fixed to the electrode 11 of the cell 1. In FIG. 3 one surface of each plate 2 defines channels 50 and 31–34 for distributing electrolyte between the electrodes. On opposite faces of the identical plates 2 and 2' there are shoulders 102, 103, 102' and 103' respectively enabling the plates to interfit with a small degree of play.

When a stack has been made, a considerable degree of clamping is provided on the surfaces of the electrodes level with the spacer tabs 13 and 13' so that no electrolyte can infiltrate between two electrodes, for example 10 and 11' which are pressed against each other. It is essential for play to remain where the distributor plates interfit with one another. The assembly is then subjected to an external covering operation by molding under pressure in order to provide overall sealing.

In each couple, sealing is provided, in addition, by gluing the edges of the aluminum electrodes to the distributor plates, and leakage currents are highly reduced by virtue of the interfitting of said distributor plates.

FIGS. 3 and 4 are a front view and a back view respectively of a distributor plate 2. The face 22 shown in FIG. 4 includes a step 21 on which the edge of an electrode 11" is glued (see FIG. 2). The electrolyte per se is distributed by the configuration of the opposite face 23 which is visible in FIG. 3.

The electrolyte inlet is provided via orifice 30. References 31 to 34 designate various channels, references 40 to 46 designate various bumps defining said channels or constituting baffles therein, and references 51 to 55 and 51' to 55' designate various electrolyte outlets. The inlet orifice 30 opens out sideways into inlet channels 50 which are not situated on the axis 4, but the assembly as a whole is symmetrical about the axis 4 as from the electrolyte inlet orifice 30.

Bump 40 serves to limit the flow of electrolyte at the inlet to a cell; it sets up a loss of head which is greater than that caused by all the other bumps, thereby calibrating the flowrate through each cell and allowing head losses within a cell to be limited.

The channels 31 to 34 are of equal depth, e.g. about two to three tenths of a millimeter.

In order to ensure that the flow speed is substantially the same at any point along axis 5 shown in FIG. 1, the speed of the central flow is reduced relative to the speed of the flow further out towards the sides. This is done by virtue of the baffles 43 and 44 provided in the channels 33 and 34 and by the central slabs 41 and 42 which are of calibrated width. The widths of the electrolyte outlets 51 to 55 and 51' to 55' are also chosen to contribute to obtaining a uniform result.

The curved shape of the side channels 31 and 32 is such that the rounded side edges of the electrodes are irrigated in the same manner as the other zones thereof.

The configuration described above ensures that electrolyte is uniformly distributed throughout each cell, and also ensures that acceptable values are obtained for leakage currents and head losses.

The electrolyte used is a solution of sodium or potassium hydroxide at a concentration of 6N to 10N.

By way of example, the electrolyte flowrate through a couple may be about 26 to 40 liters per hour.

Naturally, the invention is not limited to the embodiment which is being described above. Without going beyond the scope of the invention numerous modifications may be made to the configuration of the channels and the bumps in order to obtain a functionally equivalent configuration.

I claim:

1. An electrode stacking structure in an activatable AgO/Al battery including a plurality of parallel cells compressed together in a Volta pile or stack, each cell in the stack having a positive electrode, a negative electrode spaced from the positive electrode, and spacer tabs maintaining the separation between said electrodes, the structure comprising electrolyte injection channels adjacent a first edge of each of said cells and electrolyte collector channels adjacent a second edge, opposite the first edge, of each of said cells for distributing a flow of electrolyte from the injection channels between the electrodes of each cell into the collector channels, wherein the improvement comprises:

each of said electrolyte injection channels and said electrolyte collector channels being a plurality of parallel electrolyte distributor plates, each electrolyte distributor plate being fixed onto a corresponding one of the first and second edges of each cell, said plate having at least one transverse orifice for electrolyte entry or exit in communication with a plurality of channels provided with baffles so as to ensure a substantially uniform flow between the electrodes of a cell, and each plate including both a shoulder to which an edge of the negative electrode is glued, and a plurality of successive shoulders enabling the plate to be interfitted with identical plates of adjacent cells, the dimensions of the plurality of successive shoulders being such that a degree of play remains between plates of adjacent cells when the stack of electrodes is compressed against the respective spacer tabs.

2. A structure according to claim 1, wherein the distributor plates are made of a plastic material based on a polymer capable of withstanding high temperatures.

3. A structure according to claim 1, wherein said transverse orifice for electrolyte inlet includes a flow rate limiter.

4. A structure according to claim 3, wherein said flowrate limiter is constituted by a bump integrally molded with said distributor plate.

5. A structure according to claim 1, wherein the outlets from said channels open out in substantially the same line which is parallel to the edge of the electrode.

6. A structure according to claim 1, wherein each cell is about 1.3 mm thick.

7. A structure according to claim 6, wherein the depth of said channels lies in the range two to three tenths of a millimeter.

8. A structure according to claim 1, wherein the electrolyte flowrate through a cell lies in the range 26 to 40 liters per hour.

9. A structure according to claim 1, including a sealed insulating coating molded thereover under pressure.

* * * * *